US005096474A

United States Patent [19]

Miller, Jr. et al.

[11] Patent Number: 5,096,474

[45] Date of Patent: Mar. 17, 1992

[54] NEGATIVE PRESSURE FILTRATION DEVICE

[75] Inventors: Joseph C. Miller, Jr.; Garth S. Jones, both of Virginia Beach, Va.

[73] Assignee: Air Systems International, Inc., Chesapeake, Va.

[21] Appl. No.: 448,081

[22] Filed: Dec. 13, 1989

[51] Int. Cl.$^5$ .............................................. B01D 46/00

[52] U.S. Cl. ..................................... 55/213; 55/385.2; 55/356; 55/500

[58] Field of Search ...................... 55/213, 385.2, 356, 55/500

[56] References Cited

U.S. PATENT DOCUMENTS

| | | | |
|---|---|---|---|
| 3,924,605 | 12/1975 | Weinman et al. | 55/213 X |
| 4,154,251 | 5/1979 | Doyel | 55/385.6 X |
| 4,704,951 | 11/1987 | Pruchon | 55/213 X |
| 4,732,592 | 3/1988 | Spengler | 55/356 |
| 4,784,675 | 11/1988 | Leber et al. | 55/213 |
| 4,786,295 | 11/1988 | Newman | 55/213 |
| 4,865,634 | 9/1989 | Griffis | 55/213 |

*Primary Examiner*—Charles Hart

*Attorney, Agent, or Firm*—Mason, Fenwick & Lawrence

[57] ABSTRACT

A negative pressure filtration device is used in conjunction with a containment enclosure for the removal of hazardous material such as asbestos insulation surrounding pipes in habitable buildings. The inventive negative pressure filtration device generates a negative pressure within the containment enclosure, which negative pressure is quantitatively adjustable and capable of being continuously monitored by the user. Advantageously, the negative pressure filtration device is small, lightweight, portable, battery-operated and reliable, for use in a wide variety of hazardous material removal scenarios. The portability and versatility of the negative pressure filtration device is achieved through the use of operational vacuum pressures and air flow volumes much smaller than those of known systems.

20 Claims, 7 Drawing Sheets

NEGATIVE PRESSURE FILTRATION DEVICE

BACKGROUND OF THE INVENTION

1. Field of the Invention

The present invention relates to devices for assisting in the removal of hazardous material such as asbestos, and filtering the hazardous material from the air so that microscopic particles are not released into the atmosphere during the removal process. More specifically, the invention relates to such removal and filtration devices which employ "negative pressure", which as used herein denotes a lower pressure in a containment enclosure than ambient atmospheric pressure.

2. Related Art

Various methods and devices are known in the art for removal of hazardous materials from habitable environments. For example, methods have been developed to remove asbestos (believed to be carcinogenic) in insulation which encloses pipes and other conduits in buildings. The removal of the carcinogenic asbestos must be performed in a safe manner, if microscopic asbestos particles are not to be introduced into the atmosphere, thereby increasing the danger to building occupants rather than reducing it.

A common method of removing asbestos insulation from around pipes has been to enclose a section of pipe within a containment enclosure, sealing the apertures from which the pipe penetrated the bag with duct tape or with wire ties After the containment enclosure was secured about the insulated pipe, measures were taken to attempt to insure that, during the physical removal of the asbestos insulation from the pipe within the containment enclosure, any microscopic particle matter was retained within the containment bag rather than escaping through any hole or seams inadvertently present in the containment bag.

Typically, known methods involve the use of either no negative pressure, or negative pressure created with a HEPA vacuum. The use of HEPA vacuum creates a large amount of negative pressure and air flow volume. The large amount of negative pressure causes the containment bag to totally collapse around the insulated pipe. This collapsing is disadvantageous in that the material cannot be removed from the pipe because the arms of the user may become immobilized. Also, the plastic bag may be drawn against the vacuum hose aperture, causing total cutoff of air flow which puts excess strain on the vacuum motor.

Furthermore, in known systems, there is no way to controllably and accurately vary the vacuum pressure and air flow volume. The comparatively large vacuum in known systems, typically capable of maintaining a pressure of approximately 120 inches of water while moving 100 cubic feet per minute (cfm) possesses many disadvantages. Similarly, known systems are not pressure-adjustable or air flow volume-adjustable, nor are they capable of being delicately controlled or monitored.

High vacuum pressure in known systems places increased stress on the vacuum motor, which may cause burnout of the motor at an earlier time than if lower vacuum pressures were employed. Also, the high vacuum placed stress on the containment enclosure (typically a plastic bag), either resulting in dangerous rupture of weak containment bags or necessitating higher costs of stronger containment bags. Furthermore, the use of such a powerful vacuum requires 110-volt line voltage, causes the unit to weigh too much for true portability, and necessitates the unit to occupy too great a space to be conveniently carried into tight work areas.

Finally, known systems have possessed the disadvantage of unnecessary complexity. Certain systems employing high vacuum pressure air flow have required two apertures, including a first aperture for inputting clean air into the containment bag and a second aperture for allowing the vacuum pump to withdraw contaminated air from the interior of the containment bag through a filter.

Various U.S. patents disclose subject matter which is related to this area of technology. For example, U.S. Pat. Nos. 4,604,111, 4,613,348, 4,626,291, and 4,812,700, all to Natale, disclose containment devices and/or filter devices. U.S. Pat. Nos. 4,783,129 and 4,842,347, both to Jacobson, disclose systems for removal of hazardous waste involving glove bags. Finally, U.S. Pat. No. 953,825 (Gekeler), U.S. Pat. No. 2,741,410 (La Violette), U.S. Pat. No. 4,774,974 (Teter), and U.S. Pat. No. 4,809,391 (Soldatovic) disclose systems for removing asbestos, or devices for supporting the broader function of removing hazardous materials. All documents cited herein are incorporated herein by reference as if reproduced in full in their entirety.

Known systems, taken individually or in combination, have not provided a lightweight, portable, inexpensive means of safely removing hazardous materials. Furthermore, known systems employing negative pressure to prevent escape of hazardous particulate matter have lacked the ability to continuously and reliably monitor and control negative pressure air flow in a flexible containment enclosure, or automatically compensate vacuum pressure by adjusting the speed of the vacuum motor if a leak develops in the containment enclosure or some mechanical malfunction occurs.

Therefore, a need exists for a negative pressure filtration device and method which overcomes the limitations of the known systems.

SUMMARY OF THE INVENTION

The invention overcomes the limitations of known systems by providing a negative pressure filtration device which may be used when removing hazardous material while minimizing escape of dangerous particulate matter into the atmosphere.

The invention provides a negative pressure filtration device which automatically adjusts vacuum pressure to assure maintenance of substantially constant controlled negative pressure of the proper magnitude, both to prevent collapse of a containment enclosures which are flexible, and to insure that air is drawn inward through any leaks into the containment enclosure rather than contaminated air outward into the atmosphere. Provision is made for monitoring the magnitude of the negative pressure in a continuous manner. A convenient adjustable control allows the user to determine the level of negative pressure air flow to be applied in a given scenario.

Finally, the invention provides a negative pressure filtration device which achieves all of the above objectives in a small, lightweight, inexpensive and portable unit.

Other features and advantages of the present invention will become apparent upon a reading of the accompanying disclosure of the preferred embodiments.

BRIEF DESCRIPTION OF THE DRAWINGS

The invention may be better understood by reading the following Detailed Description of the Preferred Embodiments in conjunction with the accompanying drawings, in which like reference symbols refer to like elements throughout, and in which:

FIG. 2AA is a schematic diagram indicating a flow type pressure sensor 206 with restrictor, which may be employed in place of pressure sensor 206 in FIG. 2A;

DETAILED DESCRIPTION OF THE PREFERRED EMBODIMENTS

Figure 1A:
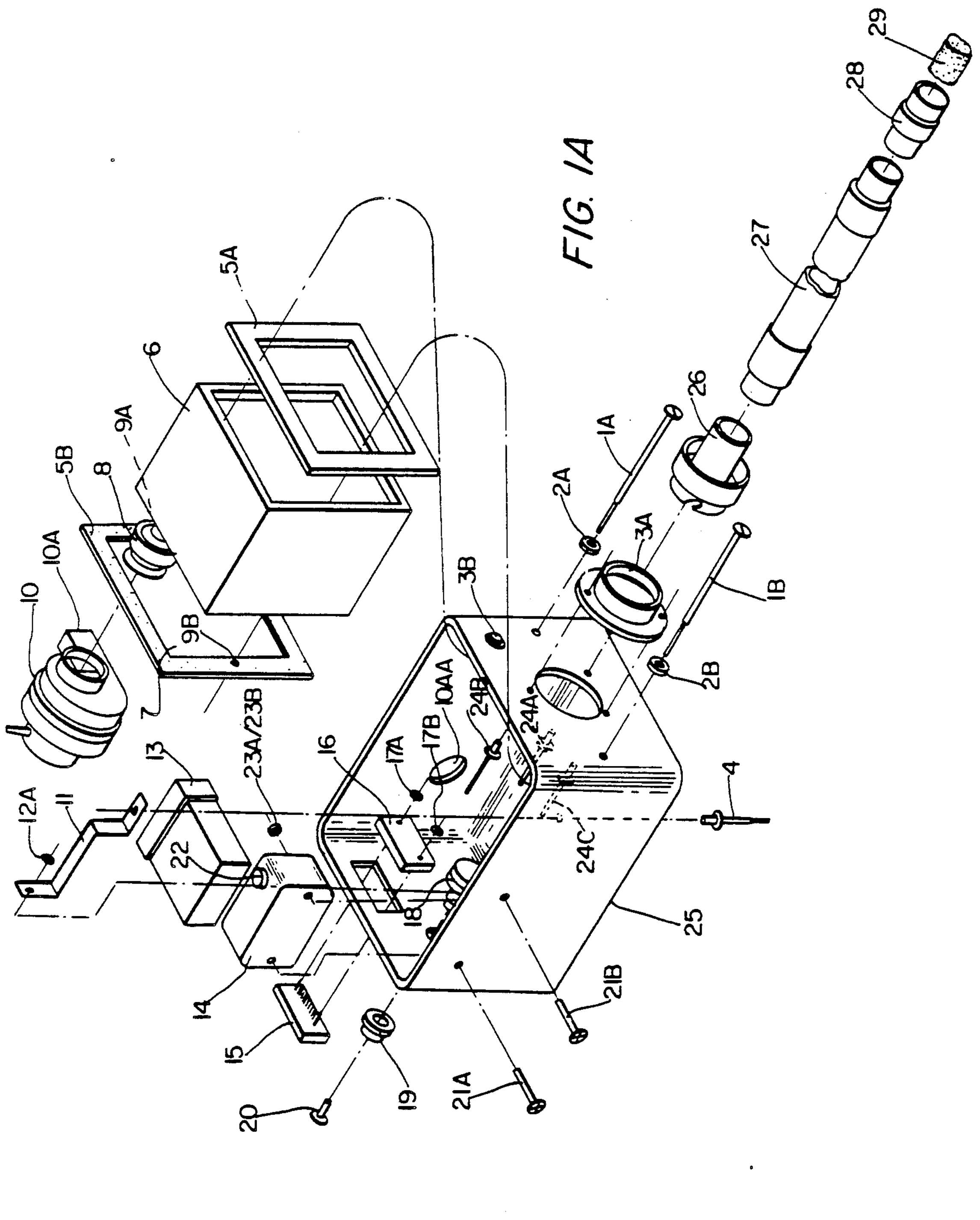
FIG. 1A is an exploded perspective view of the negative pressure filtration device according to a preferred embodiment of the present invention.

In describing preferred embodiments of the present invention illustrated in the drawings, specific terminology will be employed for the sake of clarity. However, the invention is not intended to be limited to the specific so selected, and it is to be understood that each specific includes all technical equivalents which operate in a similar matter to accomplish a similar purpose.

FIG. 1A illustrates in exploded perspective view the physical components of a preferred embodiment of the negative pressure filtration device according to the present invention. Important functional elements of the illustrated embodiment include filter 6, which filters contaminated air drawn through hose receptacle 3A by blower motor 10. A rechargeable battery pack 13 provides power to the system. A controller unit serves to control the speed of the blower motor 10. Circuitry within the controller 14 receives a user-selected setting from a potentiometer 18. Also, circuitry within the controller 14 provides to a display (such as LCD display 15) a measurement of differential pressure (a "negative pressure" between the interior of the containment enclosure and ambient air pressure).

The functioning of these elements, including functions not specific mentioned immediately above, are presented below, with respect to FIGS. 2A, 2B, 2C and 2D. Specific exemplary circuitry within the controller box 14 is described below, with respect to FIGS. 2D and 3.

For completeness, auxiliary elements in the preferred embodiment in FIG. 1A are now presented. The illustrated elements may be described as in the following chart:

| Element Number | Description |
|---|---|
| 1a and 1b | Bolt, 10/24 × 5" |
| 2 | ¼" washer |
| 3A | vacuum hose receptacle (flange) |
| 3B | sensor hose receptacle |
| 4 | rivet, 3/16" for securing element 11 |
| 5a and 5b | Neoprene filter gasket |
| 6 | HEPA filter |
| 7 | filter/motor holding plate |
| 8 | mounting nuts for element 7 |
| 9a and 9b | nut inserts for element 8 |
| 10 | blower motor |
| 10a | blower motor output |
| 10aa | aperture for blower motor output |
| 11 | battery hold-down strap |
| 12 | lock nut 10/24" |
| 13 | rechargeable battery pack |
| 14 | controller housing (for electronics and sensor) |
| 15 | LCD display |
| 16 | LCD display back plate |
| 17a and 17b | LCD display retaining nuts |
| 18 | on/off potentiometer |
| 19 | potentiometer knob |
| 20 | screw, 10/24 × ½", for element 12 |
| 21a and 21b | screw, 8/24 × 2½", for element 14a |
| 22 | battery charging jack |
| 23A and 23b | lock nut, 8/24", for elements 21a, 21b |
| 24a, b, c | rivet, 3/16", secures element 3 |
| 25 | housing |
| 26 | vacuum hose swivel |
| 27 | vacuum hose |
| 28 | pre-filter holder |
| 29 | pre-filter |

The specific means of interconnection of the various components illustrated in FIG. 1A need not be further described, other than by reference to the element descriptions immediately above. Alternative methods of physical construction lie within the contemplation of the invention and within the ability of those skilled in the art.

As known to those skilled in the art, any construction should have the feature that air drawn through hose receptacle 3A through HEPA filter 6 should follow an air tight path so that any microscopic contaminants in the air are in fact filtered by HEPA filter 6 and do not escape, either into the interior of the filtration device's housing 25 or into the external atmosphere. To this end, for example, gaskets *5a* and *5b* surround HEPA filter 6, and are compressed by the action of bolts *1a* and *1b* and nut inserts *9a* and *9b*.

Figure 1B:
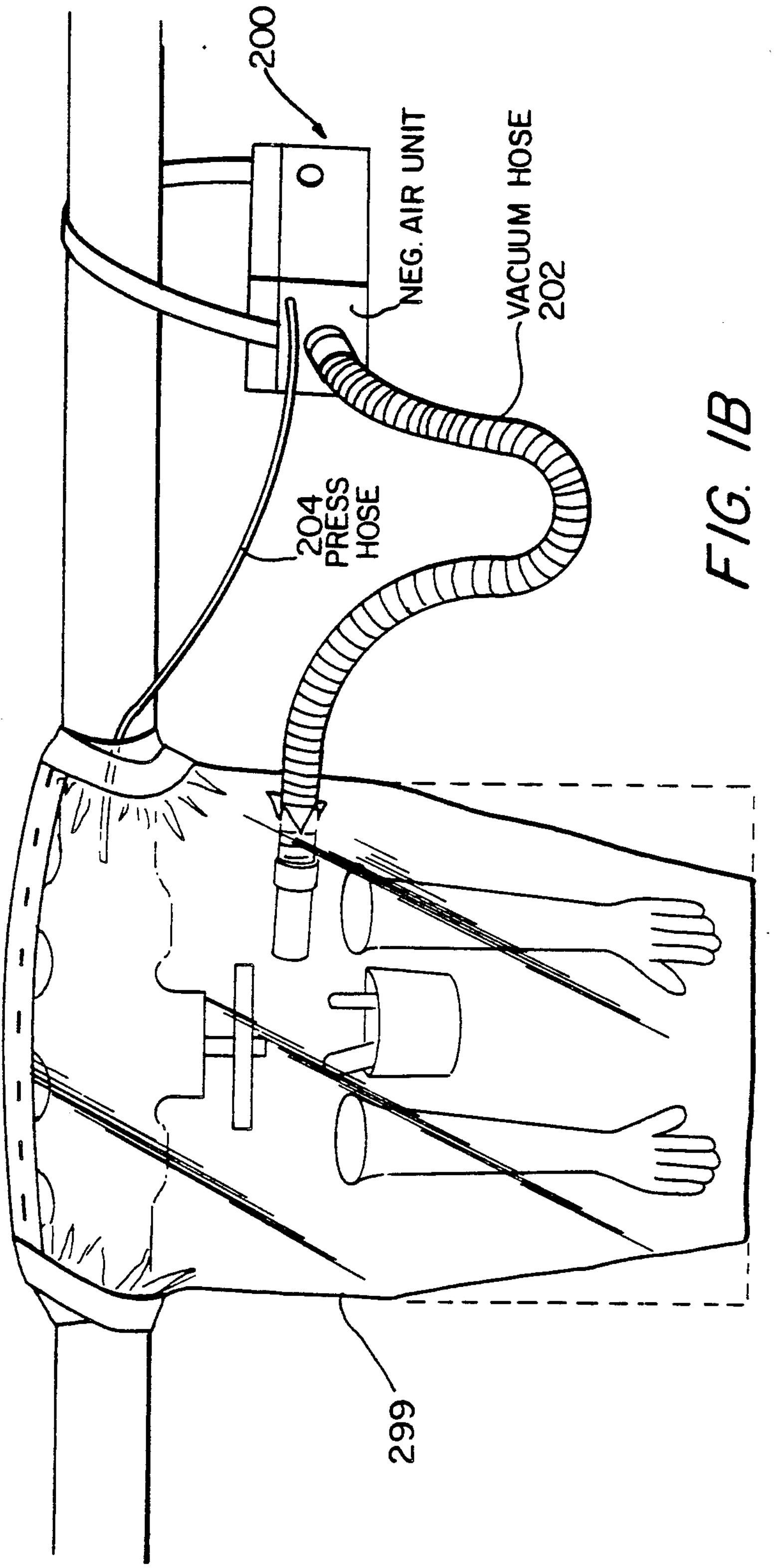
FIG. 1B is a view of an embodiment of the negative pressure filtration device connected to an exemplary containment enclosure, both hanging from a pipe whose insulation is to be removed into the containment enclosure.

FIG. 1B illustrates a preferred embodiment of the present inventive negative pressure filtration device as deployed in conjunction with a typical flexible containment enclosure.

Figure 2A:
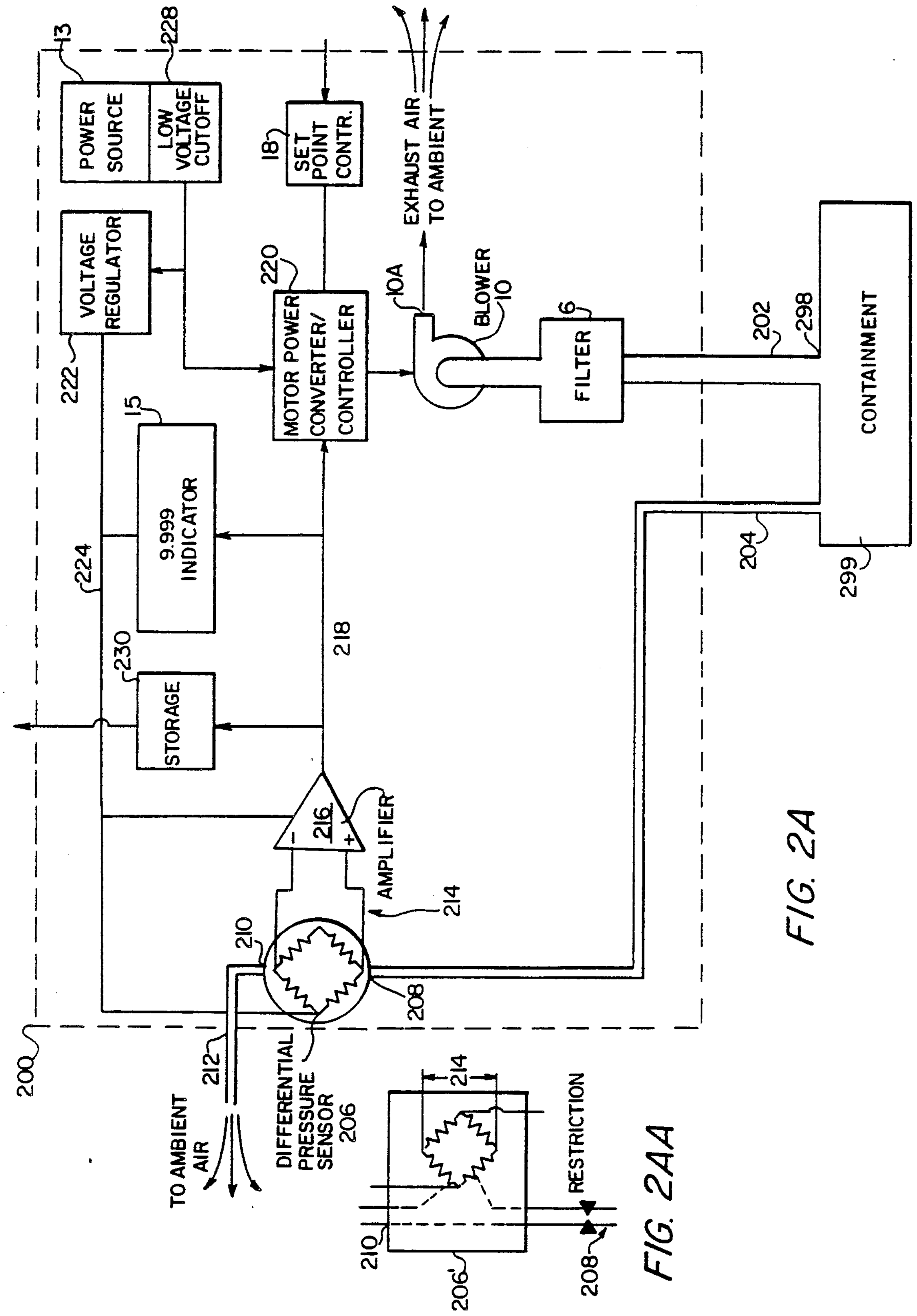
FIG. 2A is a block of a first embodiment of the negative pressure filtration device, in which a pressure sensor is involved in the measurement of differential pressure.
Figure 2B:
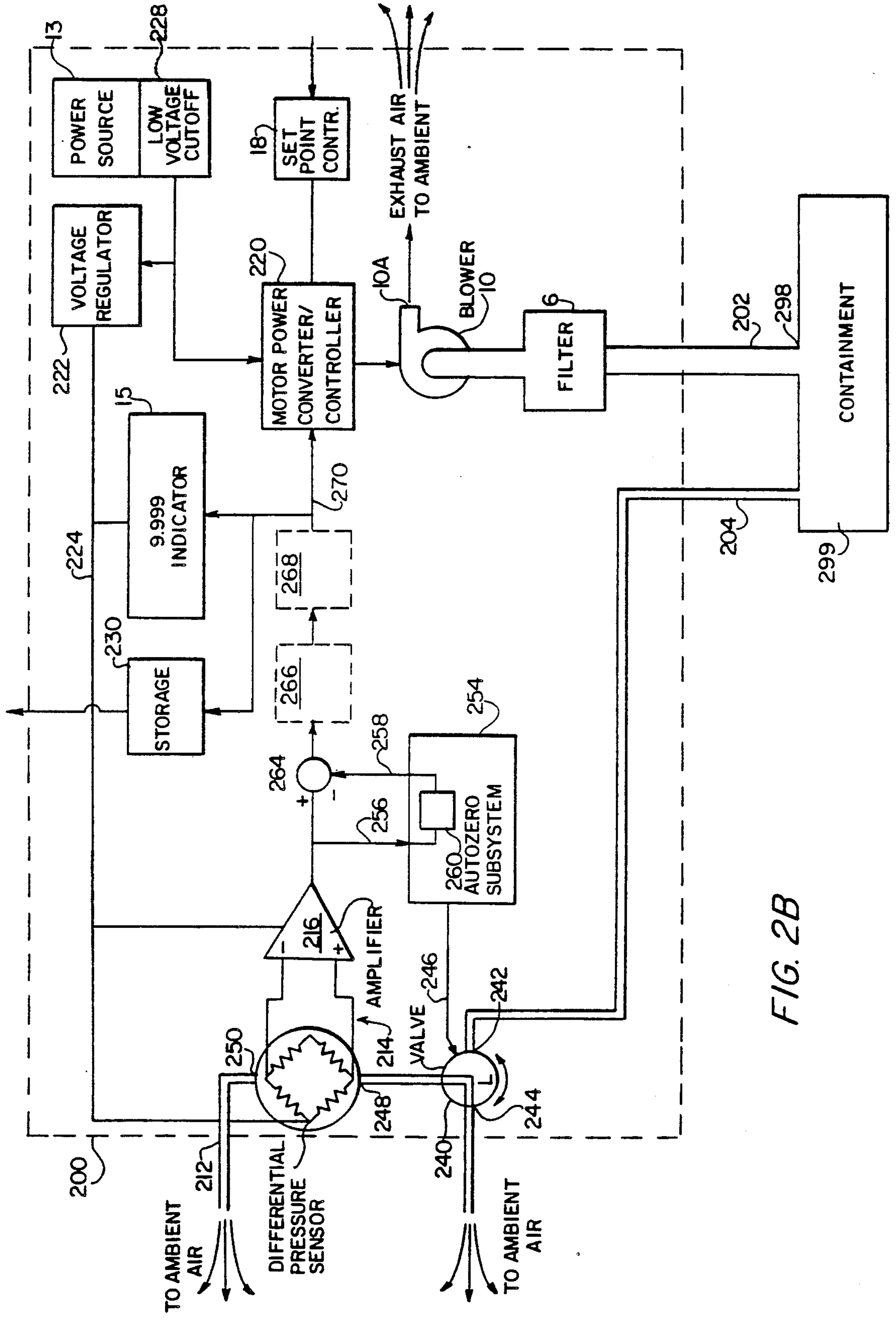
FIG. 2B illustrates in block diagram form a second embodiment of the negative pressure filtration device, in which a diaphragm-type differential pressure sensor is employed in conjunction with an autozero subsystem which compensates for offsets in zero differential pressure measurements.
Figure 2C:
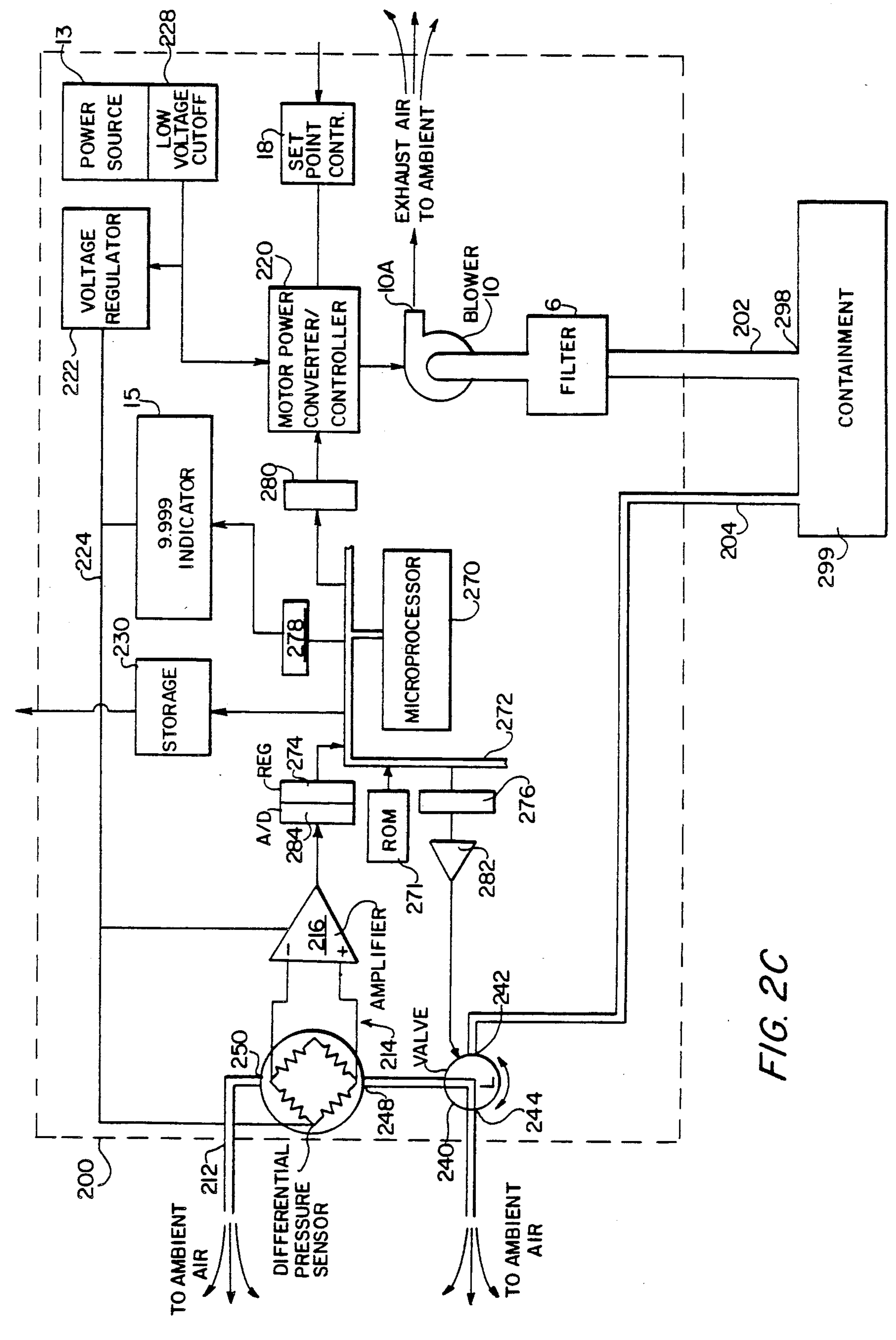
FIG. 2C illustrates in block diagram form a third embodiment of a negative pressure filtration device, in which a microprocessor performs certain functions.

FIGS. 2A, 2B, and 2C are block diagrams illustrating many functional components which were illustrated in perspective view in FIG. 1A.

The present invention comprises control circuitry which performs several functions. A primary function is to regulate the pressure difference between ambient air pressure and the pressure appearing in the containment enclosure. This function, which may be referred to as "negative pressure regulation", is a principle purpose of the present invention.

The invention provides for maintenance of this negative pressure substantially independent of variables which may be beyond the continuous control of the user. For example, the negative pressure is maintained substantially constant, independent of the magnitude of voltage output by the device's power source, an advantage which is of special utility in the event that rechargeable batteries are employed as the power source. Furthermore, the desired negative pressure may be maintained substantially constant even if there is clogging or other restriction in the filter, if leaks develop in the containment enclosure, or (with appropriate circuitry in certain embodiments) variations in the linearity or zero offsets of certain electronic components within the controller itself.

A primary advantage of the present is its capability of being implemented in an extremely small and portable package as compared with known systems. The portability of embodiments of the present invention is enabled by the fact that the present invention need only maintain much lower vacuum pressure and flow requirements (on the order of 0.02–5.0 inches of water) than known systems (100–120 inches of water). Optimally, it has been found that 0.05–0.10" of water pressure fulfill the needs of safety (exceeding the 0.02" EPA requirement), while satisfying costs and size constraints.

Similarly, in terms of volumetric flow rate of air needed to be processed through the blower, the present invention provides a maximum of on the order of only 40–100 cubic feet per minute (cfm) need be moved (as compared to approximately 80–400 cfm in known systems). Even the 40–100 cfm acceptable to the present invention is a maximum capability, not a normal operating parameter The maximum amount of air flow is needed if a rip develops in the containment bag (to minimize escape of contaminants into the atmosphere), or to evacuate remaining air from bag after use. By employing larger motors, higher volume flow rates are possible, although not necessary or generally desirable due to cost and portability considerations. Generally, however, in accordance with the normal operation of the present invention, the much smaller, lightweight feature of the negative pressure filtration device derives from its smaller-scale vacuum characteristics and simple design.

The smaller-scale vacuum characteristics derive in turn from a realization that known systems unnecessarily introduce air into the containment enclosure, only to spend additional energies withdrawing it for filtration. As illustrated in FIGS. 2A, 2B, and 2C, a single vacuum hose aperture in the containment bag is sufficient to allow operation of the inventive negative pressure filtration device, in contrast to many known systems.

Commercially useful implementations of the present invention, meeting EPA standards, may weight as little as 7 lbs. This lightweight and small size (6.25×7.25×9.5 inches) allows substantial choice for the user in positioning the unit. The unit may be hung on the pipe from which hazardous materials are being removed, or it may be placed on scaffolding or other mechanical supports in the area, or it may be carried on a shoulder strap or back pack by the individual user.

As described in three exemplary embodiments in FIGS. 2A, 2B, and 2C, the negative pressure regulation function may be performed by a feedback control loop comprising a blower 10, a pressure sensor 206 or 252, an amplifier 216, a motor power converter/controller 220, and a setpoint control 18. These elements function as described below to maintain a substantially constant negative pressure at a magnitude set by the user using setpoint control 18.

Referring now to FIG. 1B, a first embodiment of the negative pressure filtration device 200 is illustrated. The negative pressure filtration device is connected by a vacuum hose 202 and a sensing hose 204 to a containment enclosure 299. As described above in the Background of the Invention, the containment enclosure 299 may comprise a plastic bag which surrounds a volume in which hazardous material is to be removed. For example, the containment enclosure 299 may comprise a plastic bag hung from and surrounding a pipe which is covered with asbestos insulation.

In order to practice the present invention, one or apertures must be present in the containment enclosure to allow gas communication through vacuum hose 202 and sensing hose 204. In contrast to certain known systems, only one aperture is needed for creation of the negative pressure within the containment enclosure; these known systems require two apertures (one for receiving clean air into the containment enclosure, and a second, corresponding to 202, for withdrawing contaminated air into a cleaning or filtration device).

Contaminants present in the air filtered through vacuum hose 202 are filtered by filter 6. Air is drawn through filter 6 by blower motor 10, with the filtered air being exhausted to the environment through blower output 10*a*.

Meanwhile, sensing hose 204 is also in communication with the interior of containment enclosure 299. As is known to those skilled in art, it is generally considered advantageous to dispose the sensing hose 204 at a position distant from vacuum 202. This placement is designed to minimize undesired variations in sensed vacuum pressure caused by variations in air flow through juncture 298 (between vacuum hose 202 and containment enclosure 299).

Sensing hose 204 is connected to a first port 208 of a differential pressure sensor 206. A second port 210 of the differential pressure sensor 206 is connected to ambient air via pathway 212. Connected in this manner, differential pressure sensor 206 outputs a signal along pathway 214. The signal indicates the difference between ambient air at 212 and the interior of the containment enclosure 299.

Because the air pressure within containment enclosure 299 is caused to be lower than ambient air pressure (through the action of blower 10), the differential pressure measured by differential pressure sensor 206 should be negative. As used in the present specification, the term "negative pressure" denotes a pressure within a containment enclosure 299 which is lower than that of ambient air, so that if any leaks develop in containment enclosure 299, contaminants within containment enclosure 299 are substantially prevented from escaping through the leak.

The differential pressure signal along path 214 is input to an amplifier 216. Amplifier 216 outputs an amplified differential pressure signal along path 218.

Amplifier 216 provides for amplification of the magnitude of the differential pressure sensor to a magnitude which is sufficient to drive indicator 15 and converter/-controller 220. The amplified differential pressure signal is input to the indicator 15, allowing the user to continuously monitor the measured negative pressure within the containment enclosure 299.

The amplified differential pressure measurement on path 218 is also input to motor power converter/controller 220. Converter/controller 220 also receives an input from setpoint control 18. Setpoint control 18 allows the user to specify and control the negative pressure in containment enclosure 299. The converter/controller 220 controllably varies the voltage impressed across the blower's fan 10 in order to set its rotation speed in dependence on the setpoint control, so as to regulate the pressure difference between ambient air pressure and the pressure within containment enclosure 299.

Voltage regulator 222 serves a primary function of converting a voltage level from power source 13 into a controlled voltage on net 224. Net 224 feeds (directly or indirectly) components such as differential pressure sensor 206, amplifier 216, indicator 15, and converter/-controller 220.

The converter/controller 220 and the voltage regulator 222 are contained within controller box 14 (FIG. 1).

Also resident on the circuit board inside the controller box is circuitry directed to the performance of a low-voltage disconnect feature. In the event that the output of power source 13 (such as rechargeable portable batteries) falls below a certain level, the entire unit is shut off automatically. The low-voltage disconnect feature provides for disconnection of the circuitry and blower fan motor load from the power source (battery) 13. This disconnection avoids possible irreversible damage to primary cell rechargeable batteries which would otherwise result from overdischarge.

Also illustrated in FIG. 2A is a storage device for storing a pressure history recorded during a particular session of removal of hazardous material. The pressure history storage feature allows for generation of non-volatile documentation that the desired negative pressure was maintained throughout a session. Such documentation may prove useful in avoiding liability for illnesses alleged to be related to or caused by hazardous waste. If a proper negative pressure history is concretely evidenced, the argument that improper introduction of contaminants were introduced into the air during the session is substantially disproved.

In structure, the storage device could comprise any volatile or non-volatile electronic storage device, such as a random access memory (RAM). The measurements output from amplifier 216 are periodically written into the electronic storage device. At the end of a given session, the data which had been written into the storage device is down loaded to an external non-volatile storage device, or printed in hard copy form.

The filtration function of the inventive negative pressure filtration device may be enhanced through use of a pre-filter disposed in an adapter where vacuum hose 202 meets containment bag 299 (FIGS. 2A, 2B, and 2C) at 298. Briefly, the adaptor may be implemented using a tubular structure into which is inserted a cylindrical filter comprising a filtration material such as Polyester Part 6, Dinier, and #15 Dinier Mixture, from E. R. Carpenter Company, Richmond, Va. The cylindrical filter itself fits within the end of the hose's tubular structure in a pre-filter adaptor of smaller diameter than the tubular structure. Placement of a pre-filter at this point helps to insure that fewer particles, especially macroscopic particles, are drawn up the vacuum hose into the negative pressure filtration device itself.

It is advantageous to employ a vacuum hose with a sharp-ended pre-filter adaptor, which are initially disposed on opposite sides of the containment bag. By pressing the sharp-ended pre-filter adaptor into the containment hose through the containment material, thereby piercing the containment bag material within the hose, and then inserting the pre-filter itself, a sealed aperture is formed. The containment enclosure material which is firmly trapped between the vacuum hose and the pre-filter adaptor is held in place by the adaptor's insertion into the hose, allowing air to pass only through the hole pierced in the interior region of the adaptor. Placement of the pre-filter within the pre-filtered adaptor assures that all air which passes through the pierced hole has been pre-filtered.

Figure 2D:
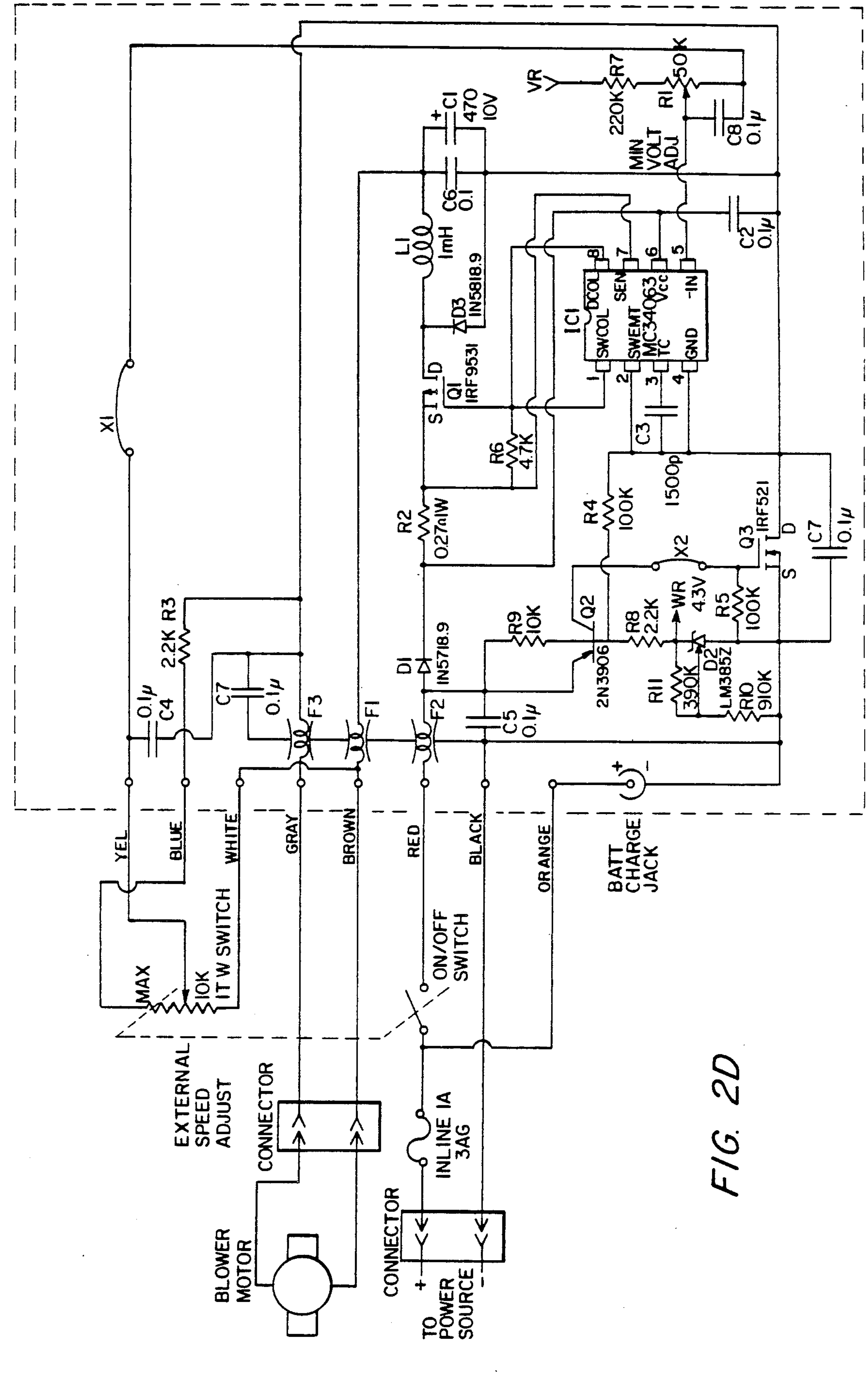
FIG. 2D is a circuit diagram illustrating a fourth embodiment of a negative pressure filtration device, in which an intelligent feedback loop (such as that in FIGS. 2A, 2B, C) is not employed, for the sake of simplicity.
Figure 3:
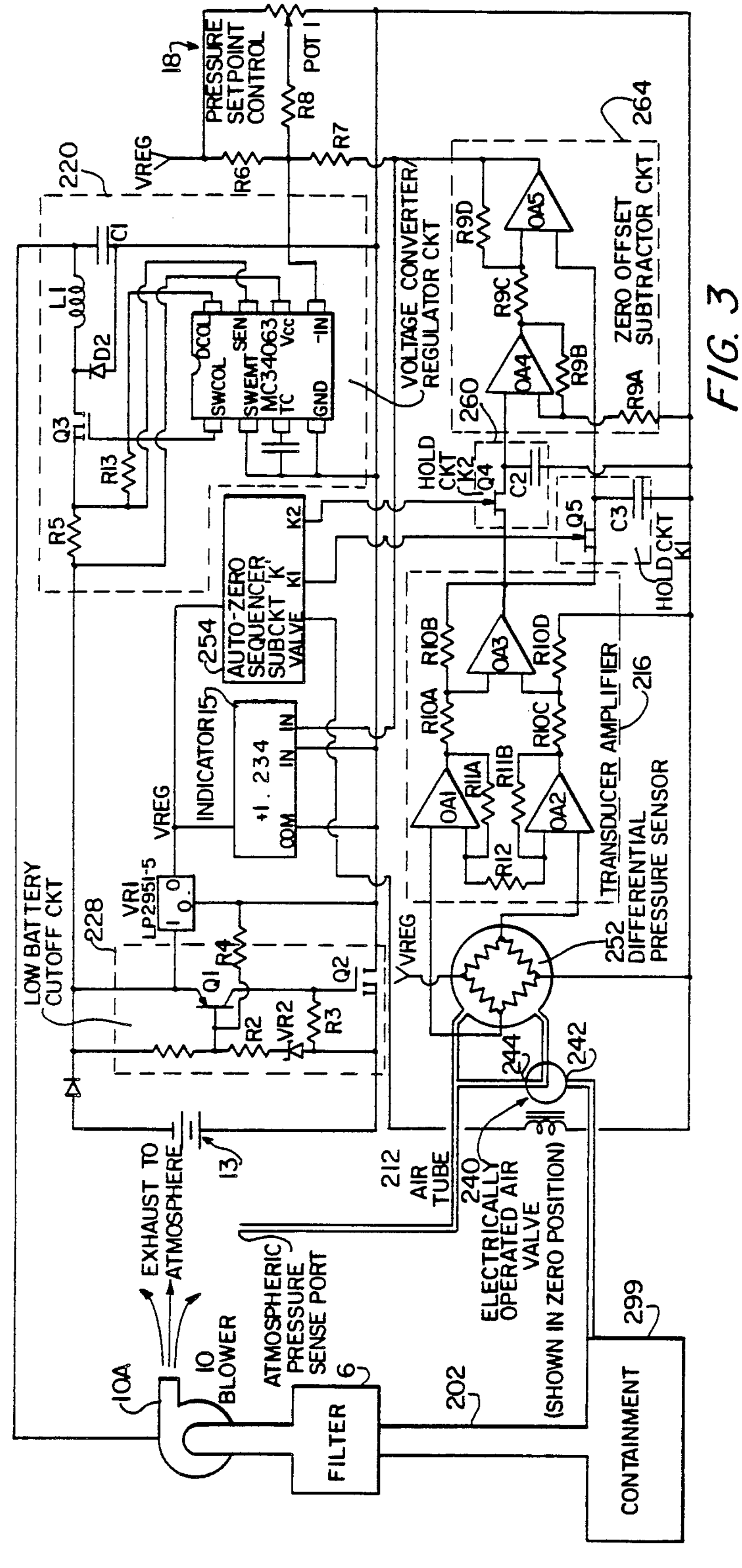
FIG. 3 is a circuit diagram illustrating a possible specific implementation of the negative pressure filtration device shown in block diagram form in FIG. 2B.

In a review of the embodiment shown in FIG. 2A, the components may be specifically implemented using the following exemplary parts:

| Element | Implementation |
|---|---|
| Sensor 206 | Honeywell AWM2100V |
| Amplifier 216 | Suitable operational amplifier(s); see also FIG. 3 |
| Filter 6 | HEPA filter (99.97% efficiency at 0.3 microns) from Cambridge Filters, of Rochester, New York |
| Indicator 15 | LED, LCD, or gauge |
| Power Source 13 | Rechargeable batteries (6 V DC) such as Panasonic #1CR6V2.4P, E.A.C., Raleigh, N.C.; or, less preferably, 110 VAC |
| Blower Motor 10 | Racal Health and Safety, Frederick, Maryland |
| Set Point Control 18 | Rheostat #31YN401, Mouser Electronics, Mansfield, Texas |
| Vacuum Hose 202 | 1.25-inch non-collapsible |
| Sensor Hose 204 | clear, flexible PVC tubing, 3/16 I.D.; 5/16 O.D., such as part # 206 series from Accuflex of Canton, Michigan |
| Voltage Regulator 222 | See FIGS. 2D, 3 |
| Converter/Controller 220 | See FIGS. 2D, 3 |

Referring now to FIG. 2B, a second embodiment of the negative pressure filtration device is illustrated. Most of the components shown in FIG. 2B may be chosen identical to those shown in FIG. 2A. However, certain new components and connections are illustrated in what may be considered in certain respects an enhancement of the embodiment shown in FIG. 2A.

Valve 240, autozero subsystem 254, and zero offset subtractor 264, alternative storage device 266, and linearizer 268 are structures which were not illustrated in FIG. 2A. Briefly, the enhancement offered by FIG. 2B is the presence of an autozero subsystem which dynamically compensates for (among other things) offset inaccuracy of the differential pressure sensor 252.

Valve 240, preferably an electrically-actuated valve or solenoid-controlled valve, has its two inputs connected respectively to ambient air via port 244 or to sensing hose 204 via port 242. The output of valve 240 is input to a first port 248 of differential pressure sensor 252. In this manner, the switchable valve 240 passes either ambient air pressure via 244 or containment enclosure pressure via 204 and 242 to the differential pressure sensor 252.

Autozero subsystem 254 provides control for the position of the valve 240 in the following manner. Periodically, such as every 30–60 seconds, the valve is switched from its "normal" connection (to the sensing hose at port 242) to its second port (connection to ambient air at 244). When valve port 244 is selected, ambient air pressure is present at both differential pressure sensors ports 248 and 250. The output of the pressure sensor at 214 should therefore be indicative of a zero pressure differential.

At this time, when the differential pressure sensor 252 outputs a reading indicative of a zero pressure differential, a temporary storage device 260 within the auto zero subsystem stores the zero-indicative value. (Ideally, though not in practice, this value should be zero. Autozero subsystem 254 compensates for occasions when it is not zero.)

During normal (reading) operation, the valve 240 is switched back to port 242, so that containment enclosure pressure passes through sensing hose 204 to the first port 248 of the differential pressure sensor. Whatever actual negative pressure is present is then output from differential sensor 252 and amplified by amplifier 216. Any improper offset of the differential pressure sensor or amplifier is compensated for by subtracting the value stored in temporary storage device 260 from the current measurement along path 262. A zero offset subtractor 264 receives the current measurement on path 262 and the stored zero-indicative value along path 258, and subtracts one from the other to arrive from a corrected, zero-adjusted measurement pressure. In this manner, the effects of any "slow wandering" (wandering slow enough that no significant change occurs between updates of the offset correction) of the zero value of the entire measurement apparatus is compensated.

The strobing of information into the display indicator 15, and the changing of control information into converter/controller 220, is properly synchronized to the switching of valve 240. Respective indicator or control data is input to these devices only when the differential pressure sensor 252 has stabilized its output after connection to sensing hose 204. In this manner, spurious effects of the zeroing portion of the auto zero function do not adversely effect the indicator or motor control functions. Alternatively, an additional zero-order hold memory (a parallel-in shift register, for example) 266 may be inserted at the output of zero offset subtractor 264. Proper negative pressure differential information, generated when the differential pressure sensor is connected to the containment enclosure interior, is stored in register 266. Thus, the timing and strobing may be applied to register 266 rather than to a plurality of elements such as indicator 15 and motor power converter/controller 220.

As an optional enhancement, a linearizing system 268 may be employed. Linearizing system serves to reduce sensor errors due to non-linearities in the system, especially in the differential pressure sensor 252. The linearization is capable of implementation by those skilled in the art and need not be further detailed herein. Those skilled in the art will readily appreciate that a conversion function may be implemented using, for example, a look-up table composed only of programmable read only memories (if implemented digitally) or an analog circuit implemented with a desired transfer function (if implemented using analog components).

The elements particular to FIG. 2B which were not present in FIG. 2A may be implemented as follows.

| Element | Implementation |
|---|---|
| Sensor 252 | MPX 10 or MPX 2010 silicon pressure sensors, from Motorola, Inc., of Phoenix, Arizona |
| Valve 240 | Micro-3-Way, (solenoid valve), from the Lee Company, Westbrook, Connecticut |

Of course, variations from these particular implementations may be made by those skilled in the art without varying from the spirit and scope of the present invention.

As stated above, amplifier 216, auto zero subsystem 254 with storage element 260, zero offset subtractor 264, temporary storage device (e.g., shift register or sample-and-hold device) 266, and linearizer 268 may be implemented using common elements known to those skilled in the electronics art, although a specific exemplary implementation is illustrated in FIG. 3, described in detail below.

FIG. 2C illustrates in block diagram form a third embodiment of the negative pressure filtration device according to the present invention. In the embodiment of FIG. 2C, a microprocessor 270 assumes many of the control and analysis functions performed by discrete components in the embodiment of FIG. 2B.

Referring to FIG. 2C, a bi-directional data input D of microprocessor 270 is connected to a data bus 272. Software governing the control and analysis functions of the microprocessor 270 is resident in read-only memory (ROM) 271, which is also connected to the data bus 272 in a manner known to those skilled in the art.

The data bus 272 provides a pathway by which data may be input to and output from the microprocessor 270. For example, the amplified differential pressure measurement from amplifier 216 may be converted (if necessary) from analog to digital form by A/D converter 284, and registered in a buffer 274 before being input to the microprocessor 270. The microprocessor performs whatever functions need be preformed in the particular embodiment (such as offset compensation) before outputting the appropriate values for the differential pressure to pressure history storage device 230 (which may be a random-access memory in direct communication with the data bus 272), and to indicator 15 (possibly through a buffer 278). A control signal governing the motor power converter/controller 220 may be buffered at 280 before being input to the converter/-controller.

The microprocessor 270 may also perform the timing and switching functions of valve 240. A binary value corresponding to the desired state of valve 240 is output to a buffer 276, and may be converted to voltage and current levels by amplifier 282 to operate a solenoid which governs the position of valve 240.

Certain general features of microprocessor-based technology have been omitted from FIG. 2C and from this description inasmuch as they are well known to those skilled in the electronics art. For example, no address bus is explicitly shown in FIG. 2C, as it is well understood that addresses may be used to selectively strobe clock pulses into buffers, or activate and deactivate tri-state buffers, so as to govern the flow of data into and out of the microprocessor 270 through use of data bus 272. Similarly, the details of implementation of software for the various functions desired to be performed by the microprocessor 270 may be written by those skilled in the art, given the functional descriptions found in this specification, before being programmed into ROM 271.

The functions governed by microprocessor 270 include not only sensing the pressure sensor output, driving the digital indicator elements, and contributing to setting the motor voltage. The low-battery cut off function (described elsewhere in this specification, with reference to FIG. 2D) may also be implemented using a microprocessor. By polling a quantitative measurement of the battery voltage, the microprocessor may halt operation based on a software comparison of the read-in battery voltage measurement with a predetermined value below which it is desired to terminate operation.

Similarly, the registers within a microprocessor are ideally suited to storage of the zero-differential-pressure offset, which offset can be subtracted from subsequent actual measurements of differential pressure between ambient air and containment enclosure pressure.

The auto-zero cycling process is also readily implemented using the timing capabilities inherent in known microprocessor-based systems. An interrupt programmed for periodical intervals (such as 30–60 seconds) may cause specific interrupt software modules to be executed by the microprocessor 270 which cause valve 240 to switch positions temporarily to ambient air, along path 244. This position is maintained until a zero pressure differential signal is output from differential pressure 252 through amplifier 216. After the zero offset reading has been input into a storage location in the microprocessor, the position of valve 240 is returned to its normal "read" position 242 for subsequent actual differential pressure measurements in the containment enclosure.

Furthermore, the linearization of the sensor may be readily performed in software. A software-implemented look up table is a preferred method of mapping input readings onto a desired set of output readings, which may then be output to buffer 280 so as to control the motor voltage.

Also, the use of a microprocessor facilitates the storage of the sequence of differential pressure readings for generation of a differential pressure history. Storage device 230, which may be the random access memory (RAM) which is commonly used in association with any microprocessor. As known by those skilled in the art, a communications cable may be directly connected to the microprocessor-based system. The negative pressure history for a given cleaning session may be output through any of a number of communications controllers (such as UARTs or USARTs) to a printer or non-volatile storage device at the opposite end of the communications cable as pictured in FIG. 2C. However, a path is shown in FIG. 2C exiting storage device 230 to be directly connected to external devices. This illustration presupposes some form of direct memory access (DMA), a process which is known to those skilled in the electronics arts.

FIG. 2D is a circuit diagram illustrating a particular embodiment which does not employ the full feedback loop shown in FIGS. 2A, 2B, and 2C. It may be considered a simplified version of those earlier-described embodiments, although it possesses the advantage of conservation of batter charge due to use of a switching type of converter.

Briefly, FIG. 2D comprises a control unit outlined in dotted lines. A potentiometer, labelled EXTERNAL SPEED ADJUST, allows the user to specify a voltage which ultimately helps to determine the magnitude of negative pressure desired for the containment enclosure. A power source is shown as a second input to the control unit. The control unit receives the negative pressure setting from the user and (employing a switching regulator control IC) converts the power source voltage (here, a DC voltage of, e.g., 6 volts) into an output voltage (adjustable to a range on the order of 1–4 volts) for controlling the speed of the indicated BLOWER MOTOR. Roughly the right-most two-thirds of the circuitry shown in the control unit is dedicated to conversion of the power source voltage to the motor control voltage; the circuitry in the left-most third of the control unit is directed to the low voltage cutoff function which avoids possible irreversible damage to rechargeable batteries that may result from over-discharge.

Specific functions of the various components of the exemplary embodiment shown in FIG. 2D are next described.

Several functions are performed by the integrated circuit IC1 (MC34063). An internal (on-chip) stable voltage reference is provided, for purposes of a comparison which in turn generates an "error" signal from which the motor control voltage is derived. A high-gain error amplifier in the chip subtracts the voltage at the device's "-IN" point from the internally-generated reference voltage, and amplifies the difference in order to drive the on-chip switching circuit. A free-running oscillator and associated switching control logic is provided (at pin 3). A current limit comparator that senses the voltage developed across an external current-sense resister R2 and shuts off the drive to the internal switching transistor when the sensed current exceeds a limit.

In operation, IC1 adjusts the duty cycle (ratio of on-time to total cycle time) of switch transistor Q1 in order to regulate the voltage sensed at its "-IN" pin. The Application Note AN920A, "Theory and Application of the MC34063 and UA78540 Switching Regulator Control Circuits" from Motorola (Schaumberg, Ill.) is incorporated herein by reference as if reproduced in full below. Implementation of the embodiment shown in FIG. 2D is not dependent on use of the MC34063, as the various functions performed by this IC may be substituted by use of other IC's, in combination with discrete components.

Use of switching regulator techniques, as opposed to "dissipative" techniques, provide embodiments of the present invention with more energy efficiency. Energy efficiency is especially important when rechargeable batteries are the power source and when portability and convenience are important. Battery power consumption may be reduced, and battery charge life thereby extended by a factor of two or more.

Switching transistor Q1 acts to duty-cycle modulate current flow through the current-regulating inductor L1, in response to the drive provided by IC1. While IC1 has internal switching transistors, an external device Q1 is employed to improve efficiency and power output capability, a substantial goal of the present invention. Q1 is advantageously chosen to be a MOSFET with low on-channel resistance, employed so as to minimize the voltage drop when conducting.

Switching inductor L1 serves to filter the modulated current flow from Q1. In a conventional manner, L1 stores energy while Q1 is conducting, and releases energy when Q1 is off.

Switching flyback diode D3 operates in conjunction with L1 to allow current flow out of L1 when Q1 is off. L1 will discharge through D3 until its stored flux is dissipated. L1, C1 and the operating frequency of IC1 (typically in the hundreds of kilohertz) are chosen to operate satisfactorily across the range of load current drawn by the blower motor.

Filter capacitors C1 and C6 act to filter the voltage appearing at the output of L1. C6 is of a type and construction to provide effective filtering of higher-frequency components.

Current sense resistor R2 serves to sense the peak current flow in the regulator for the current limit circuit of IC1. R2 straddles SEN and VCC inputs of the MC34063 chip.

Reverse protection diode D1 protects the regulator circuitry from damage that might occur from reversed connection to a power source.

Oscillator timing capacitor C3 sets the free-running frequency of the oscillator on the MC34063.

Potentiometers R7 and R1 act as a voltage divider to add an adjustable DC voltage to the sensed regulator output voltage, providing a factory adjustment for minimum blower motor voltage. Due to the design of IC1 the minimum regulated voltage is that of the internal voltage reference in IC1 (nominally 1.25 volts). The effect of the voltage added by divider action in R1 and R7 is to reduce the output voltage of the regulator.

Reference diode D2 performs two functions. In the low battery cutoff function, D2 conducts when the voltage applied across its terminals exceeds about 4.3 volts. For supply voltages at or minimally above 4.3 volts, a small conduction current flows via R8 and R9. For higher supply voltages, the higher voltage drop across R9 permits conduction via the base-emitter junction of Q2, enabling current flow at the collector of Q2 and turning on Q3. The values shown in FIG. 2D allow Q3 to remain off for supply voltages below about 5 volts, appropriate for use when the power source comprises 6 volt gelled-electrolyte lead-acid batteries.

Second, as a voltage reference, D2 provides a stable voltage at R7 to enable the minimum motor voltage adjustment described above for R7 and R1. D2 is advantageously implemented as an integrated circuit that functions as an adjustable zener diode. R10 and R11 establish its reverse conduction voltage.

Transistor Q3 serves to disconnect the switching regulator circuitry and blower motor from the supply voltage when the supply voltage is below the cutoff threshold established by the action of D2, Q2 and associated resistors. Q3 is a MOSFET with low on-channel resistance. Use of such a device minimizes the voltage drop when conducting. R5 ensures that Q3 turns off when Q2 is not conducting, and prevents turn on in the presence of any collector leakage current in Q2.

Resistor R3 serves to establish the maximum regulated voltage to the blower motor. Bypass capacitors C2, C5, C4, C7 provide a low-impedance path for flow of high frequency components of current, and serve thereby to minimize unwanted radio-frequency emissions of the circuit. Filter networks F, which may be pi-configured networks, reduce radio-frequency emissions of the circuit. Jumpers X1 and X2 are circuit-card jumpers shown to facilitate planning of fabrication, and serve only as conductors, The BATT CHARGE JACK connector is provided for convenience in recharging a battery used as a power source.

For completeness, the values or component specifications of the various components illustrated in FIG. 2D are as shown in the following chart.

| Element | Value/Specification |
|---|---|
| IC1 | MC 34063P1 |
| R1 | 50K trimpot, face-up, laydown, leads 0.1" triangular pattern, linear taper. Panasonic EVM-31GA00B15 or equivalent; Digikey 36C54 |
| R2 | 0.27 ohm metal oxide film resistor, 10%, 1 W min, 0.25" diameter (max) × 0.75" diam (max); axial leads 0.035" diam (max); RCD RSF1A series or equal; Allied 840-4xxx |
| R3 | 2.2K (5%; 0.25 W for R3-R11) |
| R4 | 100K |
| R5 | 100K |
| R6 | 4.7K |
| R7 | 220K |
| R8 | 2.2K |
| R9 | 10K |
| R10 | 910K |
| R11 | 390K |
| C1 | 470 uF, 10WVDC aluminum electrolytic, radial leads 0.2" spacing, 12 mm max diam, 18 mm max length, Panasonic ECE-A1AFS471 or equivalent; Digikey #P1204 |
| C2 | 0.1 uF, 50WVDC ceramic, radial leads, 0.2" spacing; Panasonic ECQ-V1H104JZ; Digikey P4525. |
| C3 | 1500 pF, 20 V, 0.2" leads |
| C4 | 0.1 uF, 50WVDC ceramic, radial leads, 0.2" spacing; Panasonic ECQ-V1H104JZ; Digikey P4525. |
| C5 | 0.1 uF, 50WVDC ceramic, radial leads, 0.2" spacing; Panasonic ECQ-V1H104JZ; Digikey P4525. |
| C6 | 0.1 uF, 50WVDC ceramic, radial leads, 0.2" spacing; Panasonic ECQ-V1H104JZ; Digikey P4525. |
| C7 | 0.1 uF, 50WVDC ceramic, radial leads, 0.2" spacing; Panasonic ECQ-V1H104JZ; Digikey P4525. |
| C8 | 0.1 uF, 50WVDC ceramic, radial leads, 0.2" spacing; Panasonic ECQ-V1H104JZ; Digikey P4525. |
| L1 | 1 mH toroidal inductor; Renco RL1386-1 |
| Q1 | 1RF9531 power MOSFET |
| Q2 | 2N3906 PNP transistor |
| Q3 | 1RF521 power MOSFET |
| D1 | 1N5718 or 1N5719 Schottky |
| D2 | LM385Z |
| D3 | 1N5718 or 1N5719 Schottky |
| F1, F2, F3 | EMI filters, Panasonic EXCEMT222BC, Digikey P9808 |
| EXT SPEED ADJUST | 10K potentiometer, 0.1 W min, 0.25 × 0.5 inch shaft, linear taper, SPST on-off switch with 0.5 A min rating (Radio Shack 271-1740 switch assembly - 271-1715 potentiometer) |
| Circuit Board | FR-4 or G-10, 1/16" |
| Spacer | 0.232 diam (max) × 1 3/16 long inside diameter to clear #6 screw; may be cut form nylon or metal tube stock, or made up by stacking stock spacers |
| Hookup wire | #20-22 AWG stranded tinned and fused, insulated |
| Wire for BATT CHG JACK | #20-22 AWG |

Of course, variations and modifications of the described embodiment lie within the contemplation of the invention and within the skill of those skilled in the art.

Figure 3A:
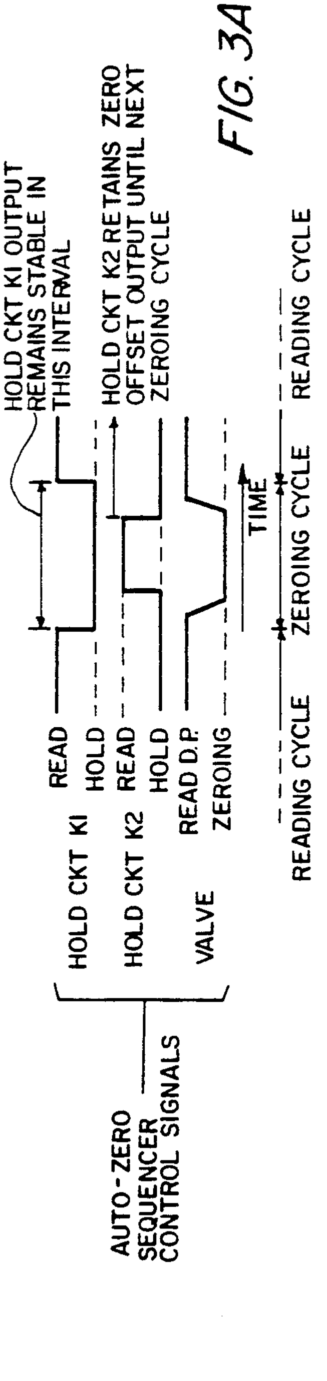
FIG. 3A is a timing diagram illustrating the functioning of the autozero sequencer in FIG. 3.

Referring now to FIGS. 3 and 3A, a particular exemplary implementation of the embodiment shown and described with respect to FIG. 2B is illustrated. Many of the particular circuit details are substantially similar to those in FIG. 2D, and the above discussion related to FIG. 2D applies to many of the circuit details shown in FIG. 3. (Certain individual components may not have corresponding designators, however, and the figures should be referred to appreciate the components' interconnection). The action of those elements of FIG. 3 not specifically described with respect to FIG. 2D are next presented.

In generating the motor control voltage, the control unit with the switching regulator control IC performs a basic function of comparing a signal indicative of the actual measured negative pressure with a voltage from the differential pressure setpoint control 18 (FIG. 2B). The difference, which may be considered an "error" in control loop terminology, is amplified so as to properly affect the motor control voltage. The comparison and amplification occurs within the motor power converter/controller block 220 in FIG. 2B.

Referring again to FIG. 3, in operation, IC1 adjusts the duty cycle (ratio of on-time to total cycle time) of switch transistor Q3 in order to regulate the voltage sensed at its "-IN" pin. This voltage is a sum of the pressure sensor output via R7, the setting of the pressure setpoint control POT1, and a bias applied via R6.

R13 ensures that Q3 is not biased on by leakage currents in IC1.

Filter capacitor C1 acts to filter the voltage appearing at the output of L1 in order to reduce variations that may otherwise cause audible noise in the blower motor.

Resistor R6 adds a DC signal component to the appearing at the "-IN" pin of IC1 to provide a adjustment for minimum blower motor voltage.

Voltage regulator VR1 provides a constant voltage supply for the sensor, motor subassembly, auto-zero subsystem, and the various operational amplifiers (denoted "OAx").

The sensor (transducer) amplifier block (comprising OA1, OA2, OA3, R10, R11, R12) functions as a differential amplifier which accepts the low-level sensor output and provides an amplified signal. A practical amplifier may require offset nulling and/or gain adjustments to compensate errors in the amplifier or sensor. These are not shown for simplicity.

The digital meter subassembly is preferably calibrated in units of pressure, and indicates the sensed differential pressure. A digital meter is shown in FIG. 3, but any type of sensitive voltage- or current-actuated indicator can be used.

Hold circuits K1 and K2 (Q4/C2, Q5/C3) store a signal voltage in capacitors C2 or C3 when the associated FET is in its off state. The downstream operational amplifiers are chosen to have suitably low input bias currents to minimize drift/droop during the holding mode.

The zero offset subtractor circuit (comprising OA4, OA5, and R9*a* . . . *d*) subtracts the signal from Hold Circuit K2 from the output of hold circuit K1. The particular configuration shown provides a high impedance load for both Hold circuits.

The potentiometer POT1 is employed by a user to establish a desired pressure control point (setpoint). The minimum-pressure position is when the slider is at the upper (+VREG) end.

The Auto-zero Sequencer provides synchronized control signal to the auto-zero valve "V", and the two hold circuits, K1 and K2. This subassembly can be of simple electrical timing circuits that produce the control signal sequence shown in the time diagram. During the "zeroing cycle", the hold circuit K2 samples the amplified sensor output signal when its ports are connected together by valve, and holds this sampled zero offset signal during the subsequent "reading cycle". During the "reading cycle", the sensor is connected to read the differential pressure created by the blower fan, the output of hold circuit K2 is stable, and is subtracted from the signal passing through circuit K1, which is in its "read" mode. The zero offset error of the sensor is subtracted from this reading by the zero offset subtractor circuit.

Reference diode VR2 provides a reference voltage for low battery cutoff operation. VR2 conducts when the voltage applied across its terminals exceeds about 4.3 volts. For supply voltages at or minimally above 4.3 volts, a small conduction current flows via R1 and R2. For higher supply voltages, the higher voltage drop across R1 permits conduction via the base-emitter junction of Q11, enabling current flow at the collector of Q1 and turning on Q2. The values shown will allow Q2 to remain off for supply voltages below about 5 volts, appropriate for use with "6 volt" gelled-electrolyte lead-acid batteries.

R4 provides a small amount of hysteresis in the action of the low-battery cutoff circuit.

FIG. 3A illustrates the timing of hold circuits K1 and K2 (FIG. 3) in relation to the two possible positions of valve 240. As shown in FIG. 3A, during the zeroing epoch of the valve, hold circuit K2 is allowed to sample and thereafter hold the zero offset output until the next zeroing epoch. Between zeroing epochs occur read epochs which substantially continuously monitor the actual negative pressure within the containment enclosure.

Modifications and variation of the above-described embodiments of the present invention are possible, as appreciated by those skilled in the art in light of the above teachings. It is therefore to be understood that, within the appended claims and their equivalents, the invention may be practiced otherwise than as specifically described.

What is claimed is:

1. A negative pressure filtration device for use with a containment enclosure, comprising:

a mechanism for drawing air from the containment enclosure, and, responsive to a controller, for maintaining a desired negative pressure differential between the interior of the containment enclosure and ambient air;

a pressure sensor, responsive to pressure within the containment enclosure and to ambient air pressure, for sensing an actual pressure differential between the interior of the containment enclosure and ambient air; and the controller for controlling operation of the mechanism for drawing air so as to maintain the desired pressure differential between the interior of the containment enclosure and the ambient air;

a vacuum hose providing for communication from the interior of the containment enclosure to the device; and a filter for filtering air from the vacuum hose so as to provide filtered air to the mechanism for drawing air before the air is exhausted from the device;

wherein the sensor senses the actual pressure differential between the interior of the containment enclosure and ambient air at a point which is upstream of the filter.

2. The negative pressure filtration device of claim 1, further comprising:

a setpoint control element for generating a signal to the controller, whereby the desired pressure differential may e specified.

3. The negative pressure filtration device of claim 1, further comprising:

an indicator, responsive to the pressure sensor, for indicating the measured differential pressure between the interior of the containment enclosure and ambient air.

4. The negative pressure filtration device of claim 1, further comprising:

at least one rechargeable battery; and a voltage regulator responsive to at least one rechargeable battery, for providing a regulated voltage.

5. The negative pressure filtration device of claim 1, further comprising:

a storage device for storing a plurality of differential pressure measurements derived from the sensed actual pressure differentials from the pressure sensor, for facilitating generation of a history of differential pressure measurements.

6. The negative pressure filtration device of claim 1, further comprising;

a value comprising first and second input ports and one output port, the first input port connected to a sensor hose in substantially direct communication with the interior of the containment enclosure, the second input port connected to ambient air, the output port in connection with the pressure sensor; and an autozero subsystem for receiving a measured pressure differential when the output port of the valve is connected to the second input port of the valve, the received pressure measurement for use in correcting for offset of pressure measurements made by the pressure sensor when the output port of the valve is connected to the first input port of the valve, wherein a zero offset of the pressure sensor is compensated for.

7. The negative pressure filtration device of claim 1, further comprising:

a power source for providing a voltage to the device; and a lower voltage cutoff circuit for cutting off power from the power source to the device when the voltage from the power source falls below a certain value.

8. The negative pressure filtration device of claim 1, further comprising:

a setpoint control element for generating a signal to the controller, whereby the desired pressure differential may be specified;

wherein the controller comprises a differential element which measures a difference between (1) the signal from the setpoint control element, and (2) an amplified sensed pressure differential from the sensor, to produce an error signal for controlling the mechanism for drawing air.

9. The negative pressure filtration device of claim 1, wherein the controller includes:

a circuit for converting a voltage from a power source to a lower voltage for application to the mechanism for drawing air, so as to reduce power usage from the power source.

10. The negative pressure filtration device of claim 9, wherein the circuit for converting includes a switching-type voltage regulation circuit.

11. An adjustable negative pressure filtration device for use with a flexible containment enclosure, comprising:

a lower pressure mechanism for drawing air from the flexible containment enclosure, and, responsive to a controller, for maintaining a desired negative pressure differential between the interior of the flexible containment enclosure and ambient air, the mechanism for drawing air capable of producing a maximum negative pressure differential of approximately 0.1 inches of water;

a pressure sensor, responsive to pressure within the flexible containment enclosure and to ambient air pressure, for sensing an actual pressure differential between the interior of the flexible containment enclosure and ambient air; and the controller, responsive to the pressure sensor, for receiving measured negative pressure differentials derived from the sensed actual pressure differentials from the pressure sensor, and for controlling operation of the mechanism for drawing air so as to maintain the desired pressure differential between the interior of the flexible containment enclosure and the ambient air;

a vacuum hose providing for communication from the interior of the containment enclosure to the device; and a filter for filtering air from the vacuum hose so as to provide filtered air to the mechanism for drawing air before the air is exhausted from the device;

wherein the sensor senses the actual pressure differential between the interior of the containment enclosure and ambient air at a point which is upstream of the filter.

12. The negative pressure filtration device of claim 11, further comprising:

a setpoint control element for generating a signal to the controller, whereby the desired pressure differential may be specified.

13. The negative pressure filtration device of claim 11, further comprising:

an indicator, responsive to the pressure sensor, for indicating the measured differential pressure between the interior of the containment enclosure and ambient air.

14. The negative pressure filtration device of claim 11, further comprising:

at least one rechargeable battery; and a voltage regulator responsive to at least one rechargeable battery, for providing a regulated voltage.

15. The negative pressure filtration device of claim 11, further comprising:

a storage device for storing a plurality of differential pressure measurements derived from the sensed actual pressure differentials from the pressure sensor, for facilitating generation of a history of differential pressure measurements.

16. The negative pressure filtration device of claim 11, further comprising;

a valve comprising first and second input ports and one output port, the first input port connected to a sensor hose in substantially direct communication with the interior of the containment enclosure, the second input port connected to ambient air, the output port in connection with the pressure sensor; and an autozero subsystem for receiving a measurement pressure differential when the output port of the valve is connected to the second input port of the valve, the received pressure measurement for use in correcting for offset of pressure measurements made by the pressure sensor when the output port of the valve is connected to the first input port of the valve, wherein a zero offset of the pressure sensor is compensated for.

17. The negative pressure filtration device of claim 11, further comprising:

a power source for providing a voltage to the device; and a lower voltage cutoff circuit for cutting off power from the power source to the device when the voltage from the power source falls below a certain value.

18. The negative pressure filtration device of claim 11, further comprising:

a setpoint control element for generating a signal to the controller, whereby the desired pressure differential may be specified;

wherein the controller comprises a differential element which measures a difference between (1) the signal from the setpoint control element, and (2) an amplified sensed pressure differential from the sensor, to produce an error signal for controlling the mechanism for drawing air.

19. The negative pressure filtration device of claim 11, wherein the controller includes:

a circuit for converting a voltage from a power source to a lower voltage for application to the mechanism for drawing air, so as to reduce power usage from the power source.

20. The negative pressure filtration device of claim 19, wherein the circuit for converting includes a switching-type voltage regulation circuit.

* * * * *